(12) United States Patent
Bech

(10) Patent No.: US 8,580,060 B2
(45) Date of Patent: Nov. 12, 2013

(54) APPARATUS FOR PREPARING A PRE-FORM

(75) Inventor: Anton Bech, Ringkøbing (DK)

(73) Assignee: Vestas Wind Systems A/S, Aarhus N (DK)

( * ) Notice: Subject to any disclaimer, the term of this patent is extended or adjusted under 35 U.S.C. 154(b) by 495 days.

(21) Appl. No.: 12/808,918

(22) PCT Filed: Dec. 18, 2008

(86) PCT No.: PCT/EP2008/067844
§ 371 (c)(1),
(2), (4) Date: Sep. 23, 2010

(87) PCT Pub. No.: WO2009/077581
PCT Pub. Date: Jun. 25, 2009

(65) Prior Publication Data
US 2011/0000608 A1  Jan. 6, 2011

Related U.S. Application Data

(60) Provisional application No. 61/008,617, filed on Dec. 19, 2007.

(30) Foreign Application Priority Data

Dec. 19, 2007 (DK) .................................. 2007 01825

(51) Int. Cl.
*B65H 81/00* (2006.01)
*B32B 37/00* (2006.01)

(52) U.S. Cl.
USPC ............................ 156/169; 156/433; 156/441

(58) Field of Classification Search
USPC ............................ 156/173, 175, 169, 433, 441
See application file for complete search history.

(56) References Cited

U.S. PATENT DOCUMENTS 4,790,898 A * 12/1988 Woods .......................... 156/166
4,878,984 A * 11/1989 Bourrieres .................... 156/431

(Continued)

FOREIGN PATENT DOCUMENTS

| EP | 0 255 425 | 2/1988 |
| EP | 0 846 551 | 6/1998 |

(Continued)

OTHER PUBLICATIONS

Caroline Foulger; International Search Report and Written Opinion issued in related International Patent Application No. PCT/EP2008/067844; Oct. 2, 2009; 22 pages; European Patent Office.

(Continued)

*Primary Examiner* — Jeff Aftergut
(74) *Attorney, Agent, or Firm* — Wood, Herron & Evans, LLP

(57) ABSTRACT

An apparatus and a method for preparing a pre-form including at least one layer of fiber tows being at least partly fixed by a resin. The apparatus includes a work surface, a fiber tow distribution device, a fiber tow retention device, and a manipulation, device which is adapted to move the fiber tow distribution device relative to the fiber tow retention device. The apparatus is arranged so that free ends of the fiber tows can be delivered from the fiber tow distribution device to the fiber tow retention device, and the fiber tow retention device is adapted for retention of the free ends so that mutual movement of the fiber tow distribution device and the fiber tow retention device away from each other causes drawing of the fiber tows through distribution passage and distribution hereof onto the work surface.

22 Claims, 4 Drawing Sheets

(56) References Cited

U.S. PATENT DOCUMENTS

| | | | |
|---|---|---|---|
| 4,943,338 A * | 7/1990 | Wisbey | 156/433 |
| 4,946,538 A | 8/1990 | Bendarzewski et al. | |
| 5,110,395 A * | 5/1992 | Vaniglia | 156/353 |
| 5,213,646 A * | 5/1993 | Zsolnay et al. | 156/166 |
| 5,290,389 A * | 3/1994 | Shupe et al. | 156/425 |
| 6,026,883 A * | 2/2000 | Hegerhorst et al. | 156/441 |
| 2005/0067731 A1 | 3/2005 | Bruyere | |

FOREIGN PATENT DOCUMENTS

| | | |
|---|---|---|
| FR | 2 761 380 | 10/1998 |
| FR | 2 882 681 | 9/2006 |
| WO | 84/00351 | 2/1984 |

OTHER PUBLICATIONS

Robot bag bedre vindmollevinger; Aug. 30, 2005; 1 page; Industriens Dagblad.

Translation of Robot bag bedre vindmollevinger (Robot behind better wind turbine blade); Aug. 30, 2005; 2 pages; The Industry's daily.

* cited by examiner

APPARATUS FOR PREPARING A PRE-FORM

TECHNICAL FIELD

The present invention relates to an apparatus and a method for preparing a pre-form comprising at least one layer of fibre tows being at least partly fixed by a resin.

BACKGROUND OF THE INVENTION

When making large wind turbine blades it has become practice to use semi-finished components with fibres in a layer of resin, i.e. a composite material. These semi-finished components can be called pre-forms. The components can, depending on their structure, provide strength primarily in one direction and they can therefore be used as reinforcement elements for the wind turbine blades.

Traditionally, "endless" sheets of a single layer of fibres in a resin have been manufactured as piece-goods. Subsequently, the sheets have been cut into smaller parts having the required shape and size. These parts have been stacked and laminated to achieve a finished reinforcement element; i.e. a pre-form.

Therefore, the traditional method causes generation of waste products as it is impossible to use the entire sheet when cutting it into smaller parts of required shape and size. As the sheets are expensive, the traditional method creates a high loss of value due to the size of the waste product. Furthermore, the cutting is time consuming and therefore increases the manufacturing costs.

In the traditional method, the sheets are cut after the fibres have been wetted in resin and this sometimes causes problems when resin adheres to the cutting device. This again increases the demand for specially designed cutting tools for cutting the wet and thus tacky sheets. Often, the pre-wetted sheets of fibres are referred to as pre-pregs. In the traditional manner where pre-pregs are cut into the desired shape, the problem with waste material increases further since the waste material contains uncured and potentially harmful resin.

When stacking the pre-pregs, air can be trapped between the layers. As the layers are semi-finished components with fibres in a layer of resin it can be difficult to remove the air being trapped between the layers.

SUMMARY OF THE INVENTION

It is an object of embodiments of the present invention to provide an improved apparatus and an improved method for preparing a pre-form.

In a first aspect, the invention provides an apparatus for preparing a pre-form comprising at least one layer of fibre tows being at least partly fixed by a resin, wherein the apparatus comprises:
  a work surface;
  a fibre tow distribution device comprising a plurality of distribution passages, each distribution passage being adapted for receiving and delivering a fibre tow, and the passages being arranged to provide a distribution distance between the delivered fibre tows;
  a fibre tow retention device adapted to retain a plurality of fibre tows; and
  a manipulation device adapted to move the fibre tow distribution device relative to the fibre tow retention device;
wherein the apparatus is arranged so that free ends of the fibre tows can be delivered from the fibre tow distribution device to the fibre tow retention device, and the fibre tow retention device is adapted for retention of the free ends at the distribution distance so that mutual movement of the fibre tow distribution device and the fibre tow retention device away from each other causes drawing of the fibre tows through the distribution passages and distribution of the fibre tows onto the work surface.

The apparatus may be used to prepare a semi-finished component, i.e. a pre-form comprising at least one layer of fibre tows being at least partly fixed by a resin. The fibre tows may be substantially parallel distributed onto the work surface where each tow is adhered individually to resin which is applied to the work surface. Consequently, the pre-form may provide strength primarily in one direction.

Different types of fibres, such a glass fibres, carbon fibres, synthetic fibres, bio fibres, mineral fibres, and metal fibres can be used depending on the final use of the pre-form. The pre-form comprises fibres in fibre tows which are bundles of a large number of individual fibres.

The resin may be an organic polymeric liquid which, when converted into its final state for use, consolidates and becomes at least partly or completely solid. As an example, the resin may be an epoxy-based resin or a polyester-based resin, though other resin types may also be applied. Furthermore, one or more different resin types may also be applied for preparation of a pre-form. If using different types of resin, it may however be an advantage to use compatible resins.

The work surface may be a worktable on which the pre-form is prepared. Alternatively, the work surface may be a backing layer or carrier layer on which the pre-form is prepared. In the latter case, the apparatus may further comprise a worktable.

The fibre tow distribution device is adapted for receiving and delivering of a plurality of fibre tows. The fibre tows may be winded up or coiled and the coils may be positioned so that delivering of fibre tows to the fibre tow distribution device uncoils the coils. As an example, the coils may be positioned above the distribution device so that movement of the distribution device in a horizontal plane is limited as little as possible by the supply of fibre tows.

The distribution device comprises a plurality of distribution passages, each being adapted for receiving and delivering a fibre tow. By arranging the distribution passages to provide a distribution distance between the fibre tows it may be ensured that the fibre tows are delivered at a predefined distance allowing for a more accurate distribution of the fibre tows. Furthermore, it is insured that the fibre tows are not tangled up, which allows for operation of the apparatus with a limited number of standstills.

During some periods only some of the distribution passages may receive and deliver a fibre tow. In this way, the number of fibre tows may be variable so that different numbers of fibre tows can be distributed. This may allow for the preparation of pre-forms comprising different numbers of fibre tows, thus allowing for the preparation of pre-forms of different size and shape. The apparatus may be adapted with a control structure capable of selecting between the available passages, those which are to be used for preparation of an specific pre-form.

The distribution distance may be variable in order to adapt the distance to a required distance between the fibre tows when delivered to the fibre tow retention device and/or adapt the distance to a required distance of the fibre tows when distributing them onto the work surface.

The fibre tows may be guided to the distribution device via one or more eyelets, one or more passages e.g. in the form of hollow rubber tubes or similar separation means, thus limiting the risk of tangling the fibre tows before they are received in the distribution passages.

The apparatus is arranged so that that free ends of the fibre tows can be delivered from the fibre tow distribution device to the fibre tow retention device, at which the fibre tows can be retained.

The manipulation device is adapted to move the fibre tow distribution device relative to the fibre tow retention device. This may be done by either moving one of the devices or by moving both of them, thus allowing for movement of these devices relative to each other. By moving the fibre tow distribution device and the fibre tow retention device away from each other by moving at least one of them, the fibre tows are drawn through the distribution passages and are distributed onto the work surface.

To retain each of the free ends of the fibre tows separately, the fibre tow retention device may be adapted to receive the fibre tows from the distribution device individually. For this purpose, the retention device may comprise one retention opening corresponding to each distribution passage of the fibre tow distribution device so that the fibre tows can be received individually in these retention openings. However, it should be understood, that all retention openings and distribution passages need not constantly be in use. Depending on the size and shape of the pre-form to be prepared, a variable number of the retention openings and distribution passages may be used.

The retention openings may be arranged with a mutual retention distance corresponding to a mutual distance of the distribution passages. This allows for substantial parallel drawing of the fibre tows through the distribution passages. Furthermore, substantially parallel distribution of the fibre tows onto the work surface may be facilitated.

To facilitate delivering of free ends of the fibre tows from the distribution device to the retention device, the apparatus may be arranged so that the retention openings and the distribution passages can be aligned to form a plurality of continuous passages for the fibre tows. As an example, this may be done by allowing either the distribution device and/or the retention device to be moved, and thus bringing them in contact with each other or at least bringing them sufficiently close to each other to ensure correct deliverance of the fibre tows from the distribution device to the retention device.

To limit inaccuracy when distributing the fibre tows onto the work surface and further facilitate drawing of the fibre tows through the distribution passages, the fibre tow retention device may comprising a retention bar which is adapted to press at least a portion of each of the fibre tows downwardly towards the work surface during distribution of the fibre tows e.g. so that the free ends of the fibre tows are pressed against the work surface.

The fibre tow distribution device may likewise comprise a distribution bar being adapted to press the fibre tows downwardly towards the work surface during distribution hereof.

Alternatively, the apparatus may comprise a fibre tow bar being adapted to press the fibre tows downwardly towards the work surface during distribution hereof. The fibre tow bar may be movable and may thus press the fibre tows towards a layer of resin along the length of the tows during distribution hereof.

The fibre tow bar may be arranged so that is does not get in contact with the resin, but only brings the fibre tows near to the resin or in contact with the resin. Subsequently, the resin may ensure that the fibre tows are at least partly fixed.

Since the fibre tows may be distributed onto the work surface or onto a layer of resin, the retention bar, the distribution bar, and/or the fibre tow bar may be smeared with resin and may become sticky. As the resin has a lower viscosity at higher temperatures it may be an advantage to heat the retention bar and the distribution bar and thus reduce the adhesiveness of the resin to limit the possibility of resin adhering to these bars. Furthermore, the fibre tows may remove the resin from the bars when in contact herewith. Consequently, a heating element may be integrated in the retention bar and in the distribution bar.

To allow movement of the distribution device relative to the retention device away from each other, the fibre tow retention device may be fixed to a manipulator which can handle either translatory movement, rotational movement or a combination thereof.

The manipulation device which is adapted to move the fibre tow distribution device relative to the fibre tow retention device may comprises at least one robot manipulator. The at least one robot manipulator may allow for translatory and/or rotational movement of one or both of the devices.

In one embodiment, the manipulation device comprises a distribution manipulator for movement of the fibre tow distribution device within a distribution work space, a retention manipulator for movement of the fibre tow retention device within a retention work space, and a work piece manipulator for movement of the work surface within a work piece work space. Each of the manipulators may be arranged for either translatory movement, rotational movement, or both. The retention work space and the distribution work space may e.g. be at different locations without intersecting each other so that collision between the retention device and the distribution device is avoided. The work piece work space may extend into both the distribution workspace and the retention work space.

As an example, the work piece manipulator may be arranged for translatory movement of the work surface within a work piece work space. This may e.g. allow for backward and forward movement of the work surface, while distributing the fibre tows onto the work surface. Consequently, the fibre tow distribution device may stand still during distribution of fibres, as the fibre tow retention device may be moved away from the distribution device while being moved together with the work surface.

It may be an advantage to apply a distribution manipulator and a retention manipulator which are arranged for both translatory and rotational movement, as this may facilitate movement of the corresponding devices, e.g. towards an operator and thus facilitate control, maintenance, and repair of the distribution device and the retention device.

As described above, the manipulators may allow movement of the work surface and the fibre tow retention device in a coordinated manner so that the retention device follows the work surface. This may be done by connecting the manipulators or by using the same manipulator for movement of the retention device and the work piece.

Alternatively, the manipulators may comprise an interface allowing them to be linked and un-linked depending on the work process to be carried out. However, it may be an advantage that at least two of the manipulators are arranged for individual movement.

The resin may contain components which may irritate or may be harmful when in contact with the skin of an operator of the apparatus. Avoidance of direct contact with the resin may thus be desirable. Consequently, the apparatus may comprise a nozzle device which is adapted for distribution of resin onto the work surface.

As the pre-form may comprise a plurality of layers of fibre tows and a plurality of layers of resin, the pre-form may in one embodiment be prepared by alternating layers of fibre tows and layers of resin. If resin is distributed in a continuous layer which substantially fully covers the fibre tows, air may be trapped in the pre-form between the layers of resin. Consequently, it may be an advantage if the nozzle device is adapted for distribution of the resin in a non-continuous layer, thus facilitating exhaustion of air from the pre-form.

By a non-continuous layer is in this connection understood a layer which does not fully cover the fibre tows, i.e. a layer which is not a closed layer. As an example, the non-continuous layer may be formed by a zigzag-pattern, by lines, by a square-formed pattern or by another pattern leaving at least some portions of the fibre tows free of resin. The pattern may also be an arbitrary pattern.

It should further be understood that the resin may be continuously distributed while forming a non-continuous layer.

As an example, the nozzle device may comprise a substantially rectangular nozzle opening allowing for lines of resin to be distributed while moving the nozzle device and opening and closing the nozzle opening during movement of the nozzle device. Alternatively, the resin may be non-continuously distributed without opening and closing the nozzle device if e.g. distributed through a perforated film or a grid comprising small openings.

A further alternative is to distribute the resin continuously in a non-continuous layer by the use of a small nozzle opening which may be movably attached to the nozzle device. By moving the nozzle opening e.g. from side to side while moving the nozzle device relative to the work surface, the resin may be distributed in a non-continuously layer forming a zigzag-like pattern. The nozzle device and the work surface may be moved relative to each other by moving at least one of them.

Other ways of distributing the resin in a non-continuous layer may also be applicable.

At room temperature, the resin may be in a semi-solid state. In order to be able to distribute the resin onto the work surface or onto the layers of fibre tows, it may be an advantage to heat the resin to a temperature at which the viscosity is decreased or where the resin becomes sufficiently "liquid" e.g. to be distributed by spraying. As an example, the resin may be heated to a temperature of e.g. 50-60 degrees C.

When the pre-form is made in an environment with a temperature close to room temperature, the viscosity of the resin may increase when the temperature approaches that of the room. The resin may e.g. become semi-solid.

This partly solidification may prevent that the fibre tows are completely not wetted before removal of the air being trapped between the layers. If wetting the fibre tows, the resin may be transferred from a non-continuous layer to a substantial continuous layer, and thus impede the removal of air.

If the pre-form is heated during or after removal of the trapped air, the resin may become sufficiently low-viscous to enable complete distribution of the resin between the fibres of the fibre tows. The temperature may e.g. be raised to a temperature above a first curing temperature allowing for a first curing process to take place. Subsequently, the pre-form may be cooled again to obtain a semi-solid pre-form, in which the resin forms a substantially continuous layer.

The pre-forms may be stored in this semi-finished state until application hereof e.g. in wind turbine component such as a blade. When preparing the final component, the component and thus the semi-solid pre-form may be heated to a temperature above a second curing temperature allowing for a second curing process to take place in order to finish curing of the pre-form.

The nozzle device and the fibre tow distribution device may be joined for joint movement. Consequently, movement of the nozzle device may not require a movement pattern being independently controlled or even an independent manipulator. Furthermore, this may allow for distribution of fibre tows and resin in one work process. However, the nozzle opening may be movable relative to the nozzle device and the fibre tow distribution device.

The geometry of the distribution pattern of the resin may be controlled by the distance between the nozzle device and the work surface. Therefore, the apparatus may further comprise a distance manipulator arranged for translatory movement of the nozzle device relative to the work surface. By increasing the distance between the nozzle device and the work surface, the width of the area of resin may be increased. If the amount of resin e.g. the mass or volume distributed onto the work surface per area unit should remain unchanged when increasing the width, the speed of which the nozzle device is moved can be lowered. Accordingly, the apparatus according to the invention may comprise a nozzle controller capable of controlling the ratio between height and speed of the manipulator to obtain a specific width and layer thickness of the resin which is applied on the work surface or fibre tows. The nozzle controller may further control the flow rate of the resin through the nozzle, e.g. by controlling the pressure of a pumping structure which pumps the resin through the nozzle.

The fibre tow distribution device and the fibre tow retention device may be adapted to be joined, e.g. when not distributing fibre tows. As an example, the distribution device and the retention device may be joined during alignment when getting ready for distribution of fibre tows. The device may remain joined during distribution of resin.

As the apparatus may be adapted for preparing pre-forms of different shapes, different sizes, and different thicknesses, the apparatus may comprise a cutting device which is provided for cutting fibre tows individually. By cutting the fibre tows individually, the prepared pre-forms may comprise fibre tows of different length.

As an example, fibre tows of different length may form a non rectangular shape of the pre-form, e.g. a trapezoid shape.

In one embodiment the cutting device may be arranged for cutting the fibre tows at the outlet of the distribution passages. Thereby, one or more of the fibre tows may be cut during distribution, while the remaining portion of the fibre tows are still distributed onto the work surface.

The apparatus may further comprise means for receiving information relating to a desired shape of the pre-form, and the cutting device may be adapted for cutting of the fibre tows in accordance with the information.

As an example, the two outermost fibre tows at both sides of the retention device and the distribution device may be cut when distributed at a length of 20 cm, while the adjacent five fibre tows at the one side and the adjacent eight fibre tows at the other side may be cut when distributed at a length of 30 cm, and the rest of the fibre tows are cut and thus terminated at a length of 50 cm. However, it should be understood, that the fibre tows need not be terminated from the outside of the pre-form. It may also be possible to terminate some of the fibre tows positioned closer to the middle of the pre-form during continued distribution of some of the outer fibre tows.

In a simple embodiment it may be preferred to terminate the fibre tows perpendicular to the distribution direction of the fibre tows, as this may allow for a fixed angle of the cutting device. Accordingly, the cutting device may be adapted for cutting of the fibre tows in an essentially straight cut forming a cut angle in the range of 80-100 degrees, the cut angle being defined as the angle between the cut and the distribution direction of the fibre tows.

In a more complex embodiment, the cutting device may be adapted for cutting the fibre tows at a cut angle being variable.

Furthermore, the cut angle may be selected independent on the desired shape of the pre-form.

In a second aspect, the invention provides a method for preparing a pre-form, the method comprising the steps of:
- providing a work surface;
- providing a fibre tow distribution device comprising a plurality of distribution passages, each distribution passage being adapted for receiving and delivering a fibre tow;
- providing a fibre tow retention device adapted to retain a plurality of fibre tows;
- providing a manipulation device adapted for relative movement of the fibre tow distribution device and the fibre tow retention device in relation to each other;
- delivering free ends of the fibre tows from the fibre tow distribution device to the fibre tow retention device at a mutual distribution distance;
- retaining the free ends of the fibre tows in the fibre tow retention device at a retention distance corresponding to the mutual distribution distance;
- moving the fibre tow distribution device and the fibre tow retention device away from each other by moving at least one of them so that fibre tows are drawn through the distribution passages; and
- distributing the fibre tows onto the work surface.

It should be understood, that the above-mentioned features of the first aspect of the invention may also be applicable to the method of the second aspect of the invention.

In particular, resin may be applied to the work surface in individual layers between each layer of fibre tows being distributed onto the work surface.

In order to ensure that the fibre tows remain on the work surface in the position where they have been distributed and thus reduce deviations in the shape of the pre-forms prepared, the method may further comprise a step of providing a nozzle device for distribution of resin, and a step of distributing resin in a non-continuous layer onto the work surface prior to the step of distributing the fibre tows onto the work surface. By distributing the resin prior to distributing the fibre tows, the resin may at least partly fix the fibre tows when distributed onto the work surface.

In a third aspect, the invention provides a fibre tow distribution device for distribution of fibre tows onto a work surface for preparation of a pre-form, the pre-form comprising at least one layer of fibre tows being at least partly fixed by a resin, the fibre tow distribution device comprising a plurality of distribution passages, each distribution passage being adapted for individually receiving and delivering a fibre tow.

It should be understood, that the above-mentioned features of the first and second aspects of the invention may also be applicable to the fibre tow distribution device of the third aspect of the invention.

In a fourth aspect, the invention provides a fibre tow retention device adapted to retain a plurality of fibre tows, the retention device being adapted for use in an apparatus for preparing a pre-form comprising at least one layer of fibre tows being at least partly fixed by a resin, the fibre tow retention device being adapted for retention of free ends of a plurality of fibre tows.

It should be understood, that the above-mentioned features of the first, second, and third aspects of the invention may also be applicable to the fibre tow retention device of the fourth aspect of the invention.

The fibre tow retention device may comprise a plurality of retention openings which are each adapted for receiving a free end of a fibre tow. Depending on the use of the retention device, a free end of fibre tows may be received in each of the retention openings, or a free end may only be received in some of the retention openings. As an example, only some of the retention openings may receive a free end, if the pre-form to be prepared is slim, whereas a wide pre-form may result in all of the retention openings receiving a free end of a fibre tow.

In order to retain the free ends in the retention openings, the fibre tow retention device may further comprise a retention lock being adapted to lock the free ends in the retention openings. The retention lock may be adapted to lock all the free ends or the retention lock may be adapted to lock a selected number of the free ends of the fibre tows. If the retention lock is adapted to lock a selected number of free ends, the retention device may be adapted to receive a free end in all the retention openings, though only fibre tows which are to be used when preparing the pre-form in question may have their free ends locked by the retention lock.

The retention lock may be adapted to lock the free ends simultaneously. The relevant free ends of the fibre tows may thus be locked simultaneously based on information on the desired shape of the pre-form to be prepared.

After having distributed the relevant number of fibre tows onto the work surface, the fibre tow retention device may cease to retain the fibre tows. Accordingly, the retention lock may be adapted to release the fibre tows after distribution of the fibre tows onto a work surface.

It should be understood that the above-mentioned features of the fibre tow retentions device may also be applicable to the fibre tow retention device of the apparatus of the first aspect of the invention.

In a fifth aspect, the invention provides a pre-form comprising at least one layer of fibre tows being at least partly fixed by a resin, wherein each fibre tow extends along an essentially straight line and terminates in an essentially straight cut which forms a cut angle in the range of 80-100 degrees to the straight line.

It should be understood, that the above-mentioned features of the first, second, third, and fourth aspects of the invention may also be applicable to the preparation of a pre-form of the fifth aspect of the invention.

It may not always be desired to have different cut angles for all the fibre tows in the pre-form. If the fibre tows were cut in a process of cutting a pre-form into the desired shape, the fibre tows would terminate at an angle being parallel to the edge of the pre-form. According to the present invention, the length of the fibre tows may determine the shape of the pre-form, and hence the pre-form may have at least one edge extending along a line, wherein at least one of the fibre tows terminates at the edge at an angle being non-parallel to the line.

BRIEF DESCRIPTION OF THE DRAWINGS

Embodiment of the invention will now be further described with reference to the drawings, in which.

DETAILED DESCRIPTION OF THE DRAWINGS

Figure 1:
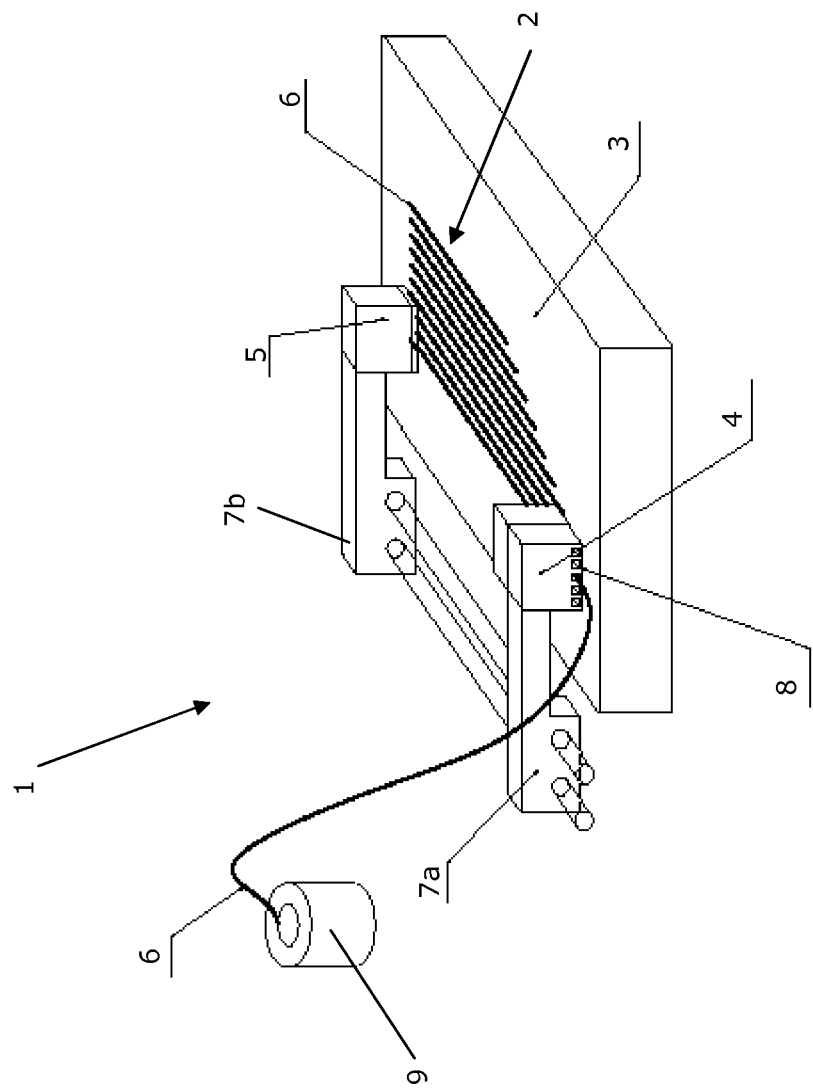
FIG. 1 illustrates an apparatus for preparing a pre-form.

FIG. 1 illustrates an apparatus 1 for preparing a pre-form 2 (only the uppermost layer hereof is shown). The apparatus 1 comprises a work surface 3, a fibre tow distribution device 4, a fibre tow retention device 5 adapted to retain a plurality of fibre tows 6, and a manipulation device 7 which is adapted to move the fibre tow distribution device 4 relative to the fibre tow retention device 5.

The first part of the manipulation device 7a is adapted to move the fibre tow distribution device 4, whereas the second part of the manipulation device 7b is adapted to move the fibre tow retention device 5. A third part of the manipulation device (not shown) is adapted to move the work surface 3.

The fibre tow distribution device 4 comprises a plurality of distribution passages 8 (for illustration purposes only some of them are shown). Each distribution passage 8 is adapted for receiving and delivering a fibre tow 6, and the distribution passages 8 are arranged to provide a distribution distance between the delivered fibre tows 6.

The apparatus 1 is arranged so that free ends of the fibre tows 6 can be delivered from the fibre tow distribution device 4 to the fibre tow retention device 5. The fibre tow retention device 5 is adapted for retention of the free ends so that mutual movement of the fibre tow distribution device 4 and the fibre tow retention device 5 away from each other causes drawing of the fibre tows 6 and distribution hereof onto the work surface 3.

In the illustrated embodiment, the work surface 3 is a table on which the pre-form 2 is prepared.

The fibre tow distribution device 4 is adapted for receiving and delivering of a plurality of fibre tows 6. In the illustrated embodiment, the fibre tows 6 are coiled and the coils 9 are positioned above the distribution device 4 so that delivering of fibre tows 6 to the fibre tow distribution device 4 uncoils the coils 9. As each of the distribution passage 8 may receive a fibre tow 6, a coil 9 exists for each of the distribution passages 8. For illustration purposes only one of the coils 9 is illustrated FIG. 1.

In order to be able to retain each of the free ends of the fibre tows 6 separately, the fibre tow retention device 5 comprises one retention opening 10 (see FIGS. 3 and 4) corresponding to each distribution passage 8 of the fibre tow distribution device 4. However, not all retention openings 10 and distribution passages 8 need constantly be in use. Depending on the size and shape of the pre-form 2 to be prepared at variable number of the retention openings 10 and distribution passages 8 may be used.

Figure 2:
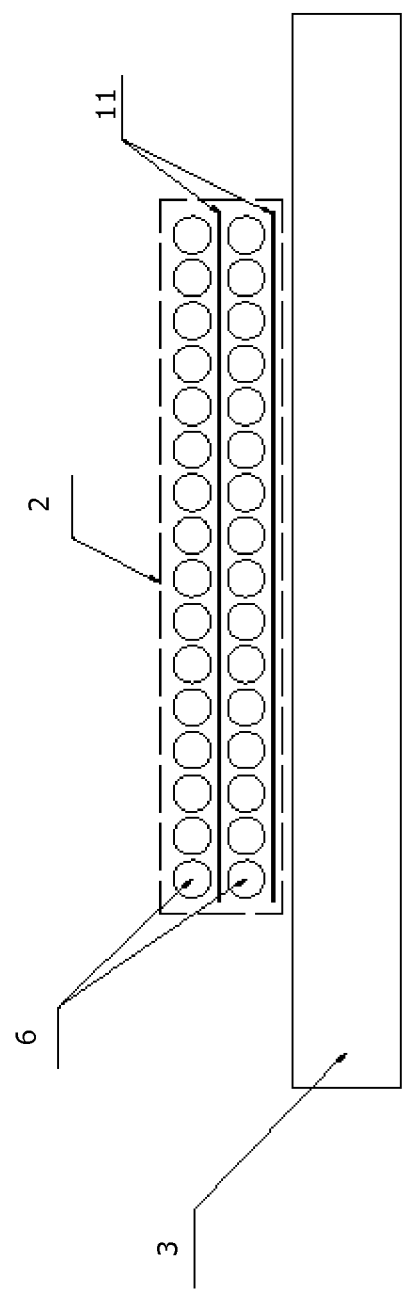
FIG. 2 illustrates a pre-form.

FIG. 2 illustrates a pre-form 2 which in the present embodiment comprises two layers of fibre tows 6 being at least partly fixed by a resin. Each layer of fibre tows 6 is partly fixed by a layer of resin 11.

Figure 3:
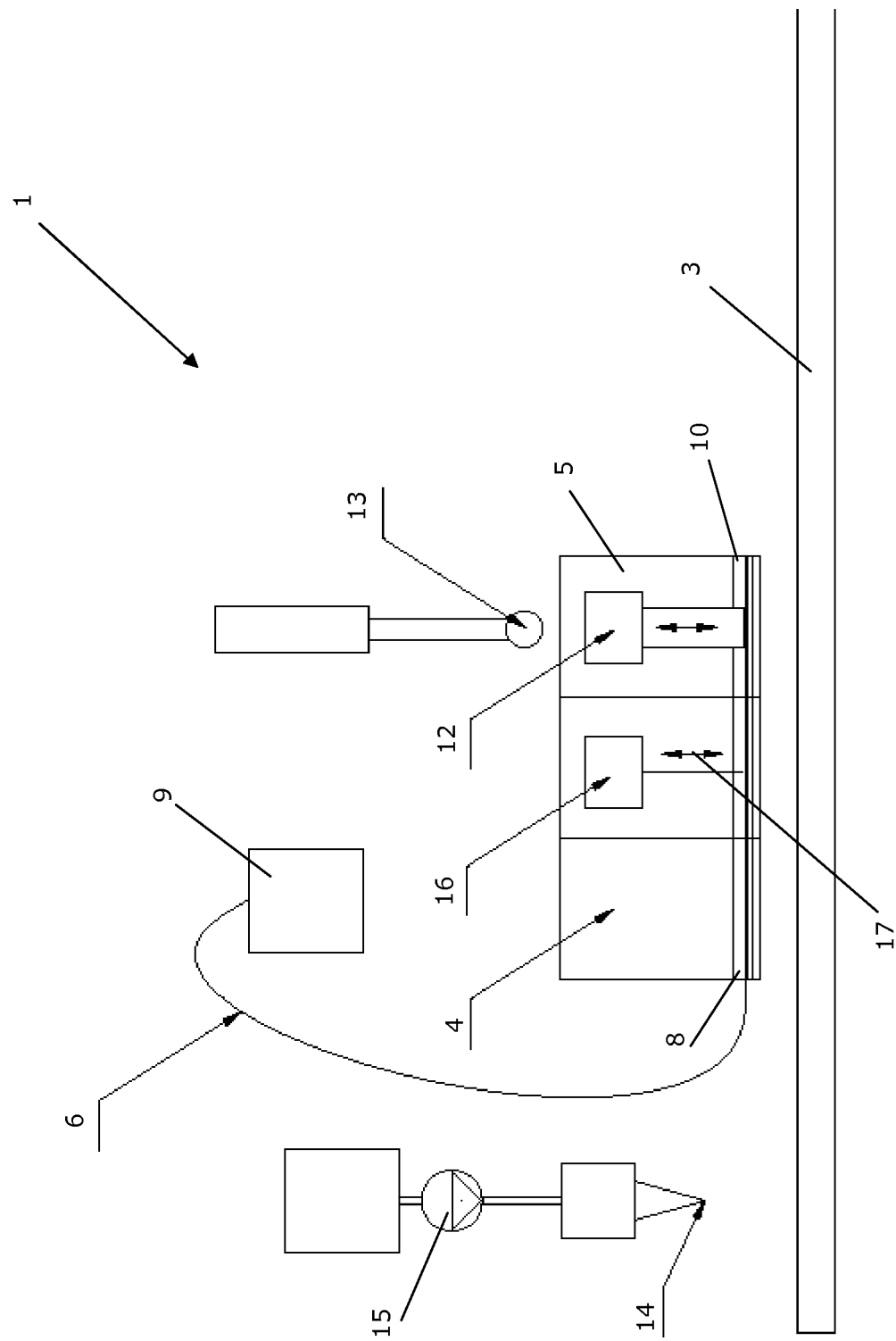
FIG. 3 illustrates an apparatus for preparing a pre-form ready to distribute fibre tows.

FIG. 3 illustrates an apparatus 1 for preparing a pre-form 2, which apparatus 1 is ready to distribute fibre tows 6. The apparatus 1 is arranged so that the retention openings 10 and the distribution passages 8 can be aligned to form a plurality of continuous passages for the fibre tows 6. In the illustrated embodiment, this is done by moving the retention device 5 towards the distribution device 4, and thus bringing them in connection with each other.

The retention openings 10 are arranged with a mutual retention distance corresponding to a mutual distance of the distribution passages 8. This allows for substantial parallel drawing of the fibre tows 6 through the distribution passages 8. Furthermore, substantially parallel distribution of the fibre tows 6 onto the work surface 3 is facilitated.

In order to retain the free ends in the retention openings 10, the fibre tow retention device 5 further comprises a retention lock 12 being adapted to lock the free ends in the retention openings 10. The retention lock 12 is able to lock all the free ends and is able to lock a selected number of the free ends of the fibre tows 6.

Figure 4:
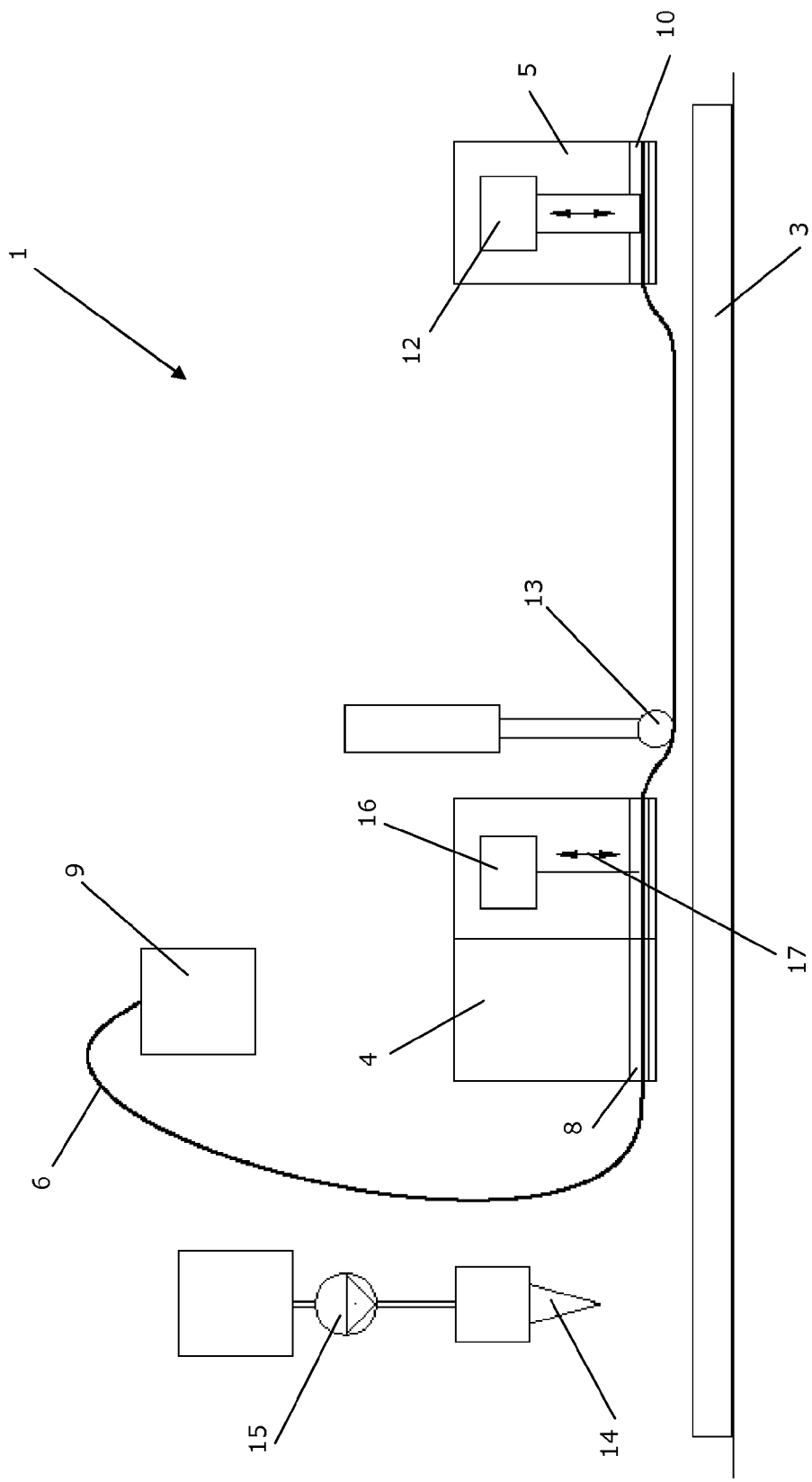
FIG. 4 illustrates an apparatus for preparing a pre-form during distribution of fibre tows.

To limit inaccuracy when distributing the fibre tows 6 onto the work surface 3 and further facilitate drawing of the fibre tows 6 through the distribution passages 8, the apparatus 1 comprises a fibre tow bar 13 which is adapted to press at least a portion of each of the fibre tows 6 downwardly towards the work surface 3 during distribution of the fibre tows 6. As illustrated, the fibre tow bar 13 is raised above the retention device 5 in a stand by position. The fibre tow bar 13 will be lowered to press the fibre tows 6 towards a layer of resin 11 (not shown in FIG. 3) on the work surface 3, when distribution of the fibre tows 6 starts. In FIG. 4 the fibre tow bar 13 is illustrated in active position.

Furthermore, the apparatus 1 comprises a nozzle device 14 which is adapted for distribution of resin onto the work surface 3. In the illustrated embodiment, the nozzle device 14 is adapted for distribution of the resin in a non-continuous layer, thus facilitating exhaustion of air from the pre-form 2.

The nozzle device 14 comprises a small nozzle opening allowing for lines of resin to be distributed while moving the nozzle device 14 relative to the length of the work surface 3 and simultaneously moving the nozzle opening from one side to the other relative to the width of the work surface 3. The amount of resin distributed is controlled by the nozzle pump 15. The relative movement of the nozzle device 14 and the work surface 3 is carried out either by moving the work surface by the third manipulation device or by moving the nozzle device 14 by the first manipulation device 7a as the nozzle device 14 can be moved together with the fibre tow distribution device 4.

As the apparatus 1 is adapted for preparing pre-forms 2 of different shapes, different sizes, and different thicknesses, the apparatus 1 comprises a cutting device 16 which is provided for cutting of the fibre tows 6 individually.

As illustrated in FIG. 1, one layer of fibre tows 6 may form a substantially trapezoid shape. In order to form a pre-form 2 of a substantially trapezoid shape, it is an advantage to be able to use fibre tows 6 of different length and thus be able to cut the fibre tows 6 individually to terminate the fibre tows 6 at different positions along the length hereof.

As indicated by the arrow 17 in FIG. 3, the fibre tows 6 are cut by lowering the cutting device 16 to cut each of the fibre tows 6 individually. After cutting of a fibre tow 6, the cutting device 16 is raised and moved perpendicular to the distribution direction to be ready for cutting of another fibre tow 6. Thereby, one or more of the fibre tows 6 can be cut during distribution hereof, while the remaining portion of the fibre tows 6 are still distributed onto the work surface 3.

FIG. 4 illustrates an apparatus 1 for preparing a pre-form 2 during distribution of fibre tows 6. As illustrated, the fibre tows 6 are being distributed by moving the fibre tow retention device 5 away from the fibre tow distribution device 4, while pressing the fibre tows 6 towards the work surface 3 by the use of the fibre tow bar 13.

The invention claimed is:

1. An apparatus for preparing a pre-form comprising at least one layer of fibre tows being at least partly fixed by a resin, wherein the apparatus comprises:
   a work surface;
   a fibre tow distribution device comprising a plurality of distribution passages, each distribution passage being adapted for receiving and delivering a fibre tow, and the passages being arranged to provide a distribution distance between the delivered fibre tows;
   a fibre tow retention device adapted to retain a plurality of fibre tows; and
   a manipulation device adapted to move the fibre tow distribution device relative to the fibre tow retention device;

wherein the apparatus is arranged so that free ends of the fibre tows can be delivered from the fibre tow distribution device to the fibre tow retention device, and the fibre tow retention device is adapted for retention of the free ends at the distribution distance so that mutual movement of the fibre tow distribution device and the fibre tow retention device away from each other causes drawing of the fibre tows through the distribution passages and distribution of the fibre tows onto the work surface.

2. The apparatus according to claim 1, wherein the fibre tow retention device comprises one retention opening corresponding to each distribution passage of the fibre tow distribution device.

3. The apparatus according to claim 2, wherein the retention openings are arranged with a mutual retention distance corresponding to a mutual distance between the distribution passages.

4. The apparatus according to claim 2, wherein the apparatus is arranged so that the retention openings and the distribution passages can be aligned to form a plurality of continuous passages for the fibre tows.

5. The apparatus according to claim 1, wherein the fibre tow retention device further comprises a retention bar being adapted to press at least a portion of each of the fibre tows towards the work surface during distribution of the fibre tows.

6. The apparatus according to claim 1, wherein the fibre tow retention device is arranged for translatory movement.

7. The apparatus according to claim 1, wherein the manipulation device comprises at least one robot manipulator.

8. The apparatus according to claim 1, wherein the manipulation device comprises:
   a distribution manipulator for movement of the fibre tow distribution device within a distribution work space;
   a retention manipulator for movement of the fibre tow retention device within a retention work space; and
   a work piece manipulator for movement of the work surface within a work piece work space.

9. The apparatus according to claim 8, wherein at least two of the manipulators are arranged for individual movement.

10. The apparatus according to claim 8, wherein the retention work space and the distribution work space do not intersect each other.

11. The apparatus according to claim 1 further comprising a nozzle device adapted for distribution of resin onto the work surface by spraying.

12. The apparatus according to claim 11, wherein the nozzle device is adapted for distribution of the resin in a non-continuous layer.

13. The apparatus according to claim 11, wherein the nozzle device and the fibre tow distribution device are joined for joint movement.

14. The apparatus according to claim 11 further comprising a distance manipulator arranged for translatory movement of the nozzle device relative to the work surface.

15. The apparatus according to claim 11, wherein the nozzle device comprises a nozzle controller adapted for variable distribution of the resin.

16. The apparatus according to claim 1 further comprising a cutting device being provided for cutting of the fibre tows individually.

17. The apparatus according to claim 16, wherein the cutting device is arranged for cutting of the fibre tows after the distribution passages.

18. The apparatus according to claim 16 further comprising a receiving device for receiving information relating to a desired shape of the pre-form, wherein the cutting device is adapted for cutting of the fibre tows in accordance with the information.

19. A method for preparing a pre-form, the method comprising the steps of:
   providing a work surface;
   providing a fibre tow distribution device comprising a plurality of distribution passages, each distribution passage being adapted for receiving and delivering a fibre tow;
   providing a fibre tow retention device adapted to retain a plurality of fibre tows;
   providing a manipulation device adapted for relative movement of the fibre tow distribution device and the fibre tow retention device in relation to each other;
   delivering free ends of the fibre tows from the fibre tow distribution device to the fibre tow retention device at a mutual distribution distance;
   retaining the free ends of the fibre tows in the fibre tow retention device at a retention distance corresponding to the mutual distribution distance;
   moving the fibre tow distribution device and the fibre tow retention device away from each other by moving at least one of them so that fibre tows are drawn through the distribution passages; and
   distributing the fibre tows onto the work surface.

20. The method according to claim 19 further comprising the steps of:
   providing a nozzle device for distribution of resin; and
   distributing resin in a non-continuous layer onto the work surface prior to the step of distributing the fibre tows onto the work surface.

21. The method according to claim 19 further comprising a step of arranging retention openings of the fibre tow retention device and the distribution passages of the fibre tow distribution device in communication with each other thereby forming a plurality of continuous passages for the fibre tows prior to the step of delivering the free ends of the fibre tows from the fibre tow distribution device to the fibre tow retention device.

22. The method according to claim 19 further comprising the steps of:
   providing a cutting device;
   providing information of a desired shape of the pre-form; and
   cutting the fibre tows individually in accordance with the information.

* * * * *